United States Patent
Weppelmann (10) Patent No.: US 11,504,721 B2
(45) Date of Patent: Nov. 22, 2022

(54) METHOD AND DEVICE FOR THE CHIP-REMOVING PRODUCTION OR MACHINING OF A WORKPIECE WITH SUBSEQUENT CHIP DISCHARGE

(71) Applicant: GLEASON-PFAUTER MASCHINENFABRIK GMBH, Ludwigsburg (DE)

(72) Inventor: Edgar Weppelmann, Asperg (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 194 days.

(21) Appl. No.: 16/639,635

(22) PCT Filed: Aug. 22, 2018

(86) PCT No.: PCT/EP2018/072692
§ 371 (c)(1),
(2) Date: Feb. 17, 2020

(87) PCT Pub. No.: WO2019/048240
PCT Pub. Date: Mar. 14, 2019

(65) Prior Publication Data
US 2021/0129157 A1    May 6, 2021

(30) Foreign Application Priority Data
Sep. 7, 2017    (DE) .......................... 102017008420.3

(51) Int. Cl.
*B03C 1/18* (2006.01)
*B03C 1/033* (2006.01)
(Continued)

(52) U.S. Cl.
CPC .............. *B03C 1/18* (2013.01); *B03C 1/0332* (2013.01); *B03C 1/06* (2013.01); *B03C 1/286* (2013.01);
(Continued)

(58) Field of Classification Search
CPC .... B03C 1/04; B03C 1/06; B03C 1/16; B03C 1/18; B23Q 11/0064
See application file for complete search history.

(56) References Cited

U.S. PATENT DOCUMENTS 3,537,586 A    11/1970   Hunkeler
3,834,542 A     9/1974   Linstruth
(Continued)

FOREIGN PATENT DOCUMENTS

DE    1935337 A1    1/1970
DE    2418224 A1   10/1975
(Continued)

OTHER PUBLICATIONS

English language machine translation for JPS61297050A, Generated Mar. 21, 2022, pp. 1-7. (Year: 2022).*
(Continued)

*Primary Examiner* — David C Mellon
(74) *Attorney, Agent, or Firm* — Robert L. McDowell (57) ABSTRACT

The invention relates to a method for the chip-removing production or machining of a workpiece by means of a tool, in which method a liquid, which mixes and accumulates with the chips produced during the machining process, is used for lubricating and/or cooling the machining process, and the chips are discharged from the accumulation counter to the downhill force along a discharge path by means of a magnetic force, wherein a return flow of the liquid carried by the discharged chips occurs due to the downhill force, and the return flow is deflected out of the discharge path and/or (Continued)

the discharge path has at least one point at which the supporting surface is temporarily withdrawn from the discharged chips.

9 Claims, 10 Drawing Sheets

(51) Int. Cl.
  *B03C 1/28* (2006.01)
  *B23Q 11/10* (2006.01)
  *B03C 1/06* (2006.01)
  *B23Q 11/00* (2006.01)
(52) U.S. Cl.
  CPC ...... *B23Q 11/0064* (2013.01); *B23Q 11/1069* (2013.01); *B03C 2201/18* (2013.01)

(56) References Cited

U.S. PATENT DOCUMENTS

| | | | |
|---|---|---|---|
| 3,952,857 A * | 4/1976 | Nazuka | B65G 29/02 198/619 |
| 4,370,225 A | 1/1983 | Bingel et al. | |
| 6,056,879 A | 5/2000 | Schaaf et al. | |
| 6,708,828 B2 * | 3/2004 | Miles | B03C 1/22 209/225 |
| 2012/0080359 A1 * | 4/2012 | Williams | B03C 1/02 209/217 |
| 2015/0078851 A1 | 3/2015 | Liepelt et al. | |
| 2019/0241368 A1 | 8/2019 | Sazawa | |

FOREIGN PATENT DOCUMENTS

| | | |
|---|---|---|
| DE | 202005009564 U1 | 10/2005 |
| GB | 1483715 A | 8/1977 |
| JP | 56-69059 A | 6/1981 |
| JP | 61-297050 A | 12/1986 |
| JP | 61-297053 A | 12/1986 |
| JP | 61-297054 A | 12/1986 |
| WO | 2015/036098 A2 | 3/2015 |
| WO | 2018/003990 A1 | 1/2018 |

OTHER PUBLICATIONS

JP S 61-297054 A, Kanetsu, English Abstract, Espacenet.
JP S 56-69059 A, Bunri, English Abstract, Espacenet.
JP S 61-297050 A, Kanetsu, English Abstract, Espacenet.
JP S 61-297053 A, Kanetsu, English Abstract, Espacenet.
International Search Report and Written Opinion for PCT/EP2018/072692, ISA/EPO, dated Nov. 29, 2018, 16 pgs.
German Patent Office Search Report for DE 102017008420.3, dated Dec. 6, 2018, 12 pgs.

* cited by examiner

METHOD AND DEVICE FOR THE CHIP-REMOVING PRODUCTION OR MACHINING OF A WORKPIECE WITH SUBSEQUENT CHIP DISCHARGE

The invention relates to a method for the chip-removing production or machining of a workpiece and a correspondingly equipped machine, and in particular the aspect of discharging the chips produced during the machining process.

A liquid, hereinafter also referred to as coolant, such as oil or other partially synthetic coolants or lubricants, or such as a liquid form based on emulsions, is used for lubricating and/or cooling the machining process. In the broadest sense, the machining process then creates a mixture of chips and coolant. In order to separate the chips and coolant, the chips are often removed from the machine using a magnetic-belt chip conveyor. The basic mode of operation of a magnetic-belt chip conveyor is known to the person skilled in the art and is moreover explained again below with reference to FIG. 1. The majority of the coolant entrained by the chips or chip accumulations removed from the mixture in this case flows back into the machine, such that said machine can maintain a coolant/lubricant circuit.

The manufacturers of magnetic-belt chip conveyors in this case optimize the liquid return flow by means of the design and process parameters of the chip conveyor that are available to them.

These parameters include the length of the discharge region in the form of a stationary, oblique surface which protrudes from the coolant tank. The longer this selected discharge region is, the more time remains for releasing the coolant from the chip accumulations, and for the return flow of said coolant to the coolant tank. In particular if the conveyance of the magnetic-belt chip conveyor is interrupted occasionally, a long discharge region is advantageous, since more time remains for releasing the coolant from the chips. However, this advantage must be weighed against an increased material requirement in the manufacture of the chip conveyor, and a larger necessary footprint.

The pitch angle at which the oblique discharge surface of the chip conveyor is positioned relative to the horizontal can also be varied to a certain extent. Of course, the downhill force increases with a steeper pitch angle and thus both the process of releasing the coolant from the chip accumulations and the return-flow speed increase.

The width of the discharge surface or discharge path is also an available design parameter for optimization, in particular for complying with the necessary conveying capacity, since a larger width allows the conveying speed to be reduced when the required cross section of the chip accumulations is the same, and thus allows more return-flow time for the coolant. Considered inversely, this allows the cross section of the chip accumulations to be reduced in the case that the conveying speed is maintained, whereupon the chip accumulations of a smaller cross section can release the coolant contained in said accumulations better than would be the case if the cross section of the accumulations were larger. However, the width of the chip conveyor is usually also limited for design reasons relating to the machine construction, apart from a higher material expenditure.

A further design parameter which can be used is the spacing of the magnets in the chip conveyor. When the conveying speed is the same, a reduced spacing of the circulating magnets leads to a reduction in the cross section of the chip accumulations and therefore, in turn, leads to an improvement in the release of the coolant. When the chip-discharge quantity of the circulating conveyor is the same, however, this requires a larger number of magnets and therefore a higher material expenditure.

By increasing the conveying speed as a process parameter, a smaller cross section of the chip accumulations, and therefore an improved release of the coolant, can likewise be achieved, this also, however, reduces the time available for the return flow, such that a suitable compromise is also to be found here, and the conveying speed cannot be increased arbitrarily.

Depending on the field of use of the magnetic-belt chip conveyor, which use also determines the required conveying rate, the aforementioned parameters are suitably matched to one another in order to discharge the chip accumulations at the end of the discharge region with as little coolant as possible.

A residual quantity of coolant that nevertheless remains and is inevitably discharged together with the chips beyond the discharge region can be separated from the collected chips, if required, using a suitable separation process which is connected downstream, for example by said coolant being allowed to trickle out of a chip container and drained, or optionally further being removed by pressing or centrifuging. This recovered coolant can then also be supplied back to the machining process.

The problem addressed by the invention is that of further improving the method of the type mentioned at the outset.

This problem is solved in terms of the method by a development of the method of the type mentioned at the outset, which development is substantially characterized in that the return flow is deflected out of the discharge path and/or the discharge path has at least one point at which the supporting surface is temporarily withdrawn from the discharged chips.

The invention is in this case based on the knowledge that, in particular in the case of rolled chips, as are often produced during the machining of metallic workpieces, and in particular liquids having a comparatively high viscosity, the proportion of the liquid which is discharged together with the chips can be determined to an extent that dispensing with a possibly complex recovery process no longer seems justified, such that the above-mentioned coordinated selection of the available parameters for the chip conveyor should be as optimized as possible. Furthermore, the invention is based on the knowledge that the optimization of the parameters explained above, which was previously familiar to a person skilled in the art, does not lead to a satisfactory solution.

According to the invention, on the other hand, the discharge path and the coolant return flow are influenced independently of favorably set parameter constellations, by means of which influence the quantity of coolant discharged by the chips can be further reduced in a satisfactory manner. As a result of the deflection of the return flow from the discharge path, a reabsorption of the coolant which is already flowing back from advancing chip accumulations can be completely, predominantly, or at least partially avoided, as a result of which the subsequent chip accumulations can reach the end of the discharge path in a drier state. By the supporting surface being temporarily withdrawn from the discharged chips, the chip accumulations are subjected to a jumping movement, as a result of which, or upon the landing of said chips, the release of the liquid from the chip accumulations is increased.

The discharge path can in this case extend over a certain width, which can correspond to the width of a conventional magnetic-tape chip conveyor; the discharge path is therefore planar rather than linear.

The magnetic force acts on the chip accumulations by means of first regions which have a strong magnetic field and move along the discharge path in the discharge direction, which first regions are separated by second regions which have a lower magnetic field. This is achieved, for example, by arranging elongate (transverse to the direction of discharge) magnets spaced apart from one another on a circulating belt, as in a conventional magnetic-belt chip conveyor.

A return-flow region for the return-flowing liquid (coolant) is preferably arranged under the discharge path in the direction of gravity.

In a particularly preferred embodiment, at least two deflection points are provided along a discharge path, and the ratio $\beta$ of the spacing between two consecutive deflection points in the discharge direction to the spacing between two consecutive first regions in the discharge direction is preferably less than $1/(1+\gamma\alpha)$, where the dimensionless parameter (factor) $\gamma$ is at least $\frac{1}{5}$, preferably at least $\frac{1}{3}$, in particular at least $\frac{1}{2}$, and where a is the ratio of the speed of movement of the first regions to the return-flow speed of the liquid. In this design, a satisfactorily low quantity of discharge is determined. In this case $\gamma$ is greater than $\frac{3}{5}$, in particular is greater than $\frac{4}{5}$, and in particular reaches or even exceeds 1. In specific designs, in particular for highly viscous coolants (kinematic viscosity of more than 50 mm$^2$/s (measured at 40° C.)), $\beta$ is less than $\frac{1}{8}$, in particular less than $\frac{1}{10}$. For medium-viscosity coolants (kinematic viscosity in the range of 5-50 mm$^2$/s), reasonable results are already obtained where $\beta$ is less than $\frac{1}{4}$, in particular where $\beta$ is less than $\frac{1}{6}$. In the case of low-viscosity coolants (kinematic viscosity if less than 5 mm$^2$/s), a $\beta$ which is less than 0.8 may also lead to reasonable results.

In a preferred embodiment, the method is carried out using coolants which have a kinematic viscosity of preferably greater than 2 mm$^2$/s, more preferably greater than 3 mm$^2$/s, in particular greater than or equal to 5 mm$^2$/s. In particular in the case of special applications in the toothing machining process, however, it is preferred for the kinematic viscosity of the coolant to be no greater than 50 mm$^2$/s, preferably no greater than 44 mm$^2$/s, in particular no greater than 36 mm$^2$/s.

With regard to an average gradient of the discharge path (which substantially determines the magnitude of the acting downhill force), values of 35° or greater are preferable, values of 40° or greater are more preferable, in particular of 50° or greater. By contrast, it is expedient if the average gradient of the discharge path is no steeper than 85°, more preferably no steeper than 75°, in particular no steeper than 65°.

With regard to the conveying speeds (speed at which the magnets/regions of a strong magnetic field move), speeds of greater than 0.2 m/min, more preferably greater than 0.35 m/min, in particular greater than or equal to 0.5 m/min, can be used in a suitable manner. However, it is preferred for the conveying speed to be no greater than 3 m/min, more preferably no greater than 2 m/min, in particular no greater than 1 m/min.

Appropriate minimum lengths of 30 cm or more, preferably 60 cm or more, in particular 1 m or more, are considered for the length of the discharge paths. It is also preferred for the length to be no greater than 3 m, more preferably no greater than 2.5 m, in particular no longer than 2 m. With regard to the width of the discharge path, values of at least 10 cm, preferably at least 20 cm, in particular at least 25 cm, are preferred. In this case it is further preferred for the width to be no greater than 80 cm, more preferably no greater than 65 cm, in particular no greater than 50 cm. In the case of coolants which have a very low-viscosity, the conditions for $\beta$ are not as stringent, in this case $\beta$ can also be less than 4, 3 or 2.

In a further preferred embodiment, the condition $\beta<1/(1+\gamma\alpha)$ is applied at the start of the discharge path, but the condition can also be present along the entire discharge path between two consecutive deflection points. The discharge path begins with the exit from the liquid accumulation. In terms of the device, a design embodiment would preferably be implemented starting from the intended minimum level in the tank or even below said level. A regular arrangement of the diversion points along the conveying direction, as well as transversely to the conveying direction, is possible and easier to manufacture, but not necessary. The number, shape and arrangement of the diversion points can vary in the discharge direction and also transversely thereto (in the width direction).

In one possible design, a deflection point is assigned to a support withdrawal point, in particular each deflection point is assigned to a circulation withdrawal point. The quantity of coolant released due to the jump can thus be deflected promptly and quickly.

The invention can also be used on a plurality of chip conveyors connected in series.

In a particularly preferred embodiment, the return-flowing liquid (coolant) flows into a return-flow chamber, and the discharge path is separated from one or more openings by a barrier. As a result, a larger chip concentration is largely prevented from reaching the return-flow chamber and possibly clogging the chamber or clogging the openings. In one possible embodiment, one or more portions are provided in which liquid flowing back from a deflection point flows back, spatially separated from and parallel to a liquid flowing back from a deflection point which is subsequent in the discharge direction, the discharge path at said parallel-flow portions in particular having a ramp portion upstream of a support withdrawal point.

In this case the ramp portion can form the barrier explained above, the coolant flowing back from the diversion point which is subsequent in the discharge direction can already flow back in the return-flow chamber. The coolant that flows back earlier may only reach the return-flow chamber somewhat downstream.

The average additional gradient of the ramp portions compared to the basic gradient of the conveyor may be at least 5°, preferably at least 12°, in particular at least 20°. Depending on how high the basic gradient of the conveyor already is, it is preferred for the average additional gradient of the ramp portions to be no greater than 50°, more preferably no greater than 45°, in particular no greater than 40°. For the jump height at the jump points (measured orthogonally to the conveying surface defined by the conveyor (surface 28 in the drawings)), it is preferred for said height to be at least 1 mm, more preferably at least 2 mm, in particular at least 3 mm. The jumps should also be no higher than 15 mm, more preferably no higher than 12 mm, in particular no higher than 9 mm. A very suitable range is between 4 and 8 mm in jump height.

In terms of the device, a machine is provided, in particular a toothing machine for the chip-removing production or machining of a workpiece, in particular of a toothing on a workpiece, by means of a machining tool, in particular a toothing tool, comprising a supply device for a liquid used for lubricating and/or cooling the machining process, a collecting region, in which the liquid which is mixed with the chips produced during the machining process collects, and a chip discharge device for discharging the chips along a discharge path counter to the downhill force by means of a magnetic force, which device allows a return flow of the liquid carried away by the discharged chips, which flow is caused by the downhill force, the toothing machine being substantially characterized in that the chip discharge device has at least one deflection point at which the liquid return flow is deflected out of the discharge path, and/or has at least one support withdrawal point at which the supporting surface is temporarily withdrawn from the discharged chips.

The advantages of the machine according to the invention can be found in the advantages of the method explained above, likewise the advantages of the further developments of the machine in the form of the dependent machine claims. Insofar as chips are also generated during, for example, metal machining processes, such as drilling or turning workpieces, that are additionally carried out as part of toothing machining processes, the above-mentioned discharge principle can likewise be used, as well as for generally different types of machining processes in which metallic chips accumulate in a mixture with a coolant.

In terms of design, the chip discharge device preferably has a first, stationary, oblique surface as a chip discharge surface, on which the chips which are to be discharged move upward, and a second, stationary, oblique surface on which the return-flowing liquid runs downward. The first can preferably be detached, in particular removed, from the second.

Furthermore, a chip discharge device having the essential aspects as explained above is also protected, which device is suitable for a machining machine, in particular a toothing machine, as well as an attachment for forming a chip discharge device, which attachment likewise has the relevant features and, by being placed on magnetic-belt chip conveyors, which in particular are already conventional, forms a chip discharge device having the features explained above. In terms of the method, the separation steps of the method are also protected independently of the chip source.

The dimension of the spacing between the regions (magnets) and the chip discharge surface is selected such that the magnetic force is still sufficient to move the chip accumulation along the discharge path without said accumulation getting caught and/or sliding back. It is also selected in such that the return-flow chamber which is formed as a result can accommodate the return flow in terms of volume.

Further features, details and advantages of the invention can be found in the following description with reference to the accompanying drawings, in which.

The basic principle of a chip discharge device is first explained with reference to FIG. 1, which principle includes a magnetic-belt chip conveyor, as it is often used in toothing machines which machine metal materials using coolant. A tank 2 which is provided with an outlet 4 is shown on a floor region of a machine which is not shown hereinafter, which tank could be arranged, for example, on a floor region of the machine. The tank is filled with a coolant that is used for cooling and/or lubricating the associated toothing machining process, and thus also contains the chips that are produced during the machining process. The arrow on the left-hand side in FIG. 1 indicates the continuous supply of the cooling medium with metal magnetizable chips during the operation of the toothing machine.

A conveyor 6 is partially accommodated in the tank 2, by a horizontal region of the conveyor being immersed in the coolant and an adjoining, obliquely rising region 7 of the conveyor 6, once it reaches the fill level, protruding from the cooling medium. The conveyor 6 conveys the metal chips at a speed V out of the tank 2, obliquely upward over the inclined region 7 until, after traversing through the turning point at the free end of the conveyor 6, said chips fall into a chip container 40 placed below. For this purpose, the conveyor 6 has a stationary surface 8, on which the metal chips rest, and an endlessly circulating belt 9 which has magnets 10 which are moved at regular intervals together therewith.

Due to the magnetic forces, metal chips accumulate opposite the circulating magnets 10, and the accumulations move on the stationary surface 8, together with the magnets 10 and the speed thereof. At the release point 11, the chip accumulations can no longer follow the returning magnets closely enough and therefore fall into the chip container 40 due to the diminishing magnetic force. The coolant, which is still carried by the metal chip accumulations when they exit the tank 2 and which is continuously released by said accumulations, flows back in the direction of the tank 2 in the obliquely rising (falling) region, due to the downhill force along the stationary surface 8. Residual coolant 20, which is inevitably discharged until the metal chips are released, is then also contained in the chip container 12, like the chips 30, as is shown in an idealized manner in FIG. 1 for illustrative purposes.

Figure 1:
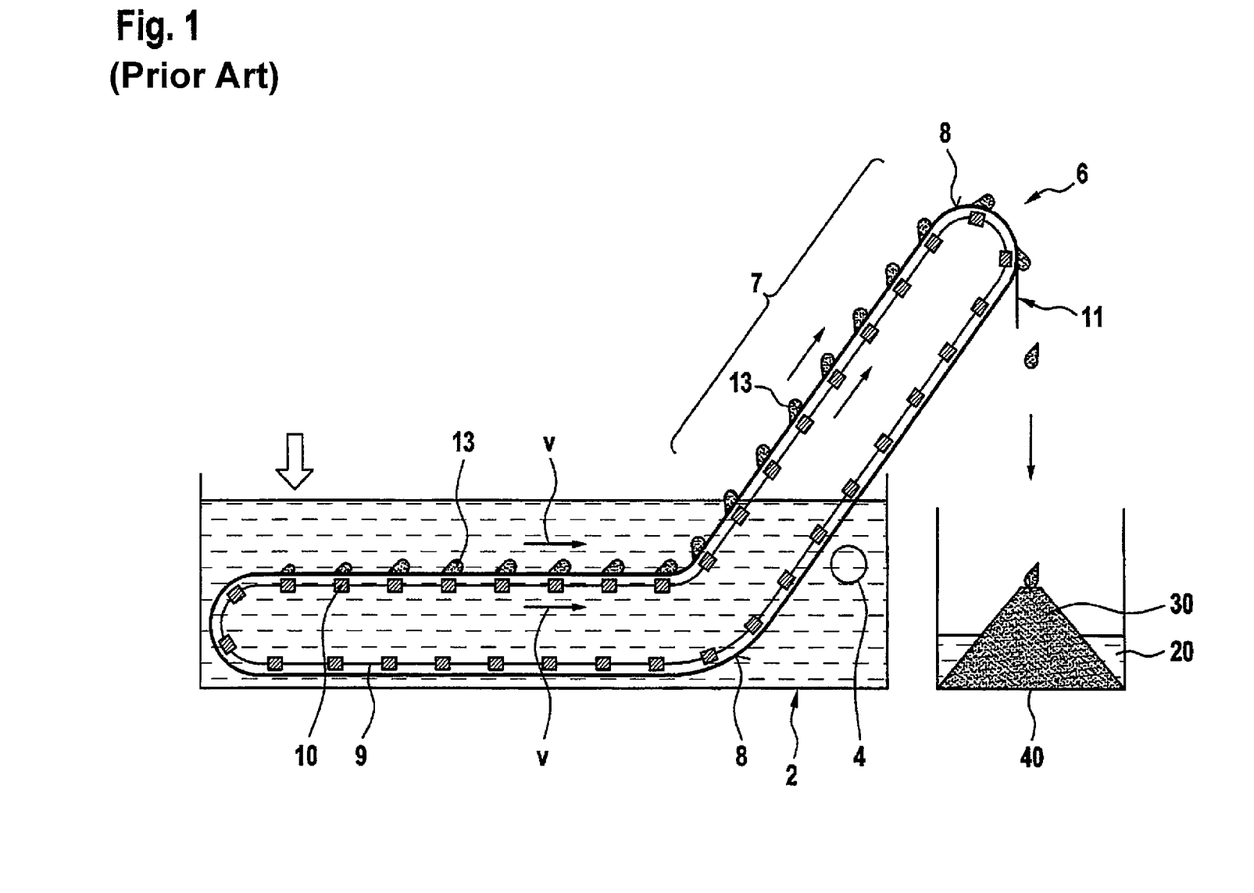
FIG. 1 shows the basic principle of a magnetic-belt chip conveyor.
Figure 2:
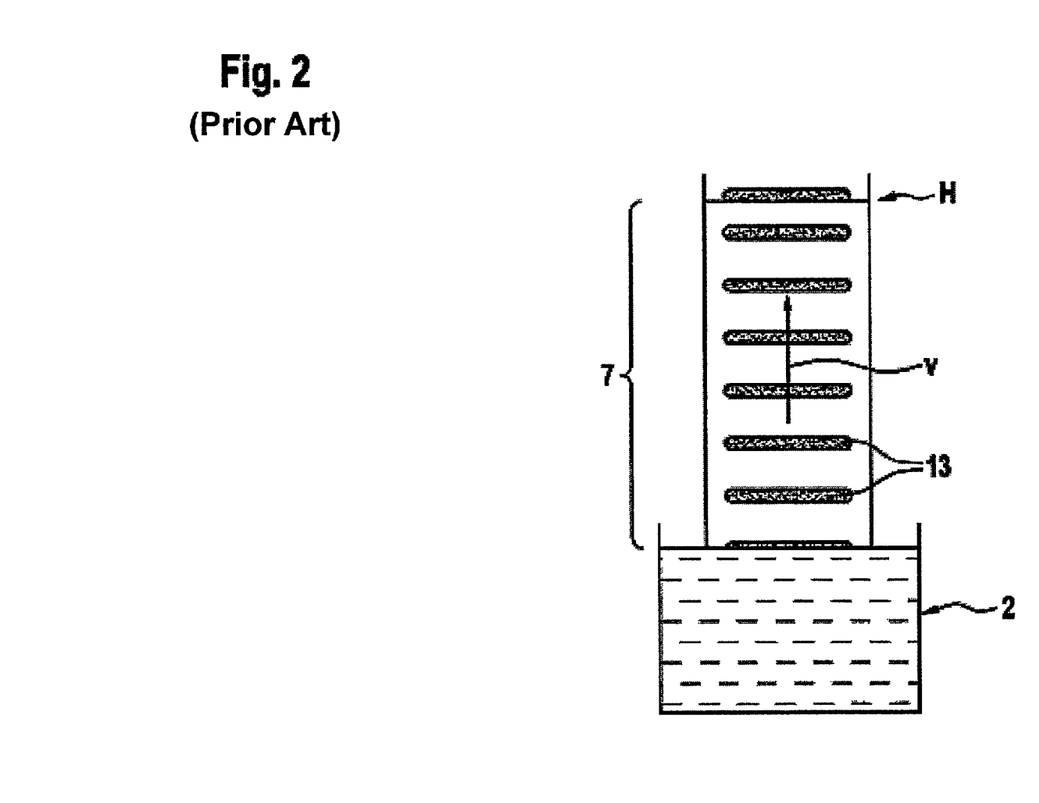
FIG. 2 is a two-dimensional view of the magnetic-belt chip conveyor from FIG. 1.

In FIG. 2 the oblique region 7 which protrudes from the tank 2 up to a height H is shown in a schematic additional side view which is parallel to the horizontal direction in FIG. 1, such that the design of the conveyor 6 as a belt which extends in the width direction can be better recognized.

Figure 3:
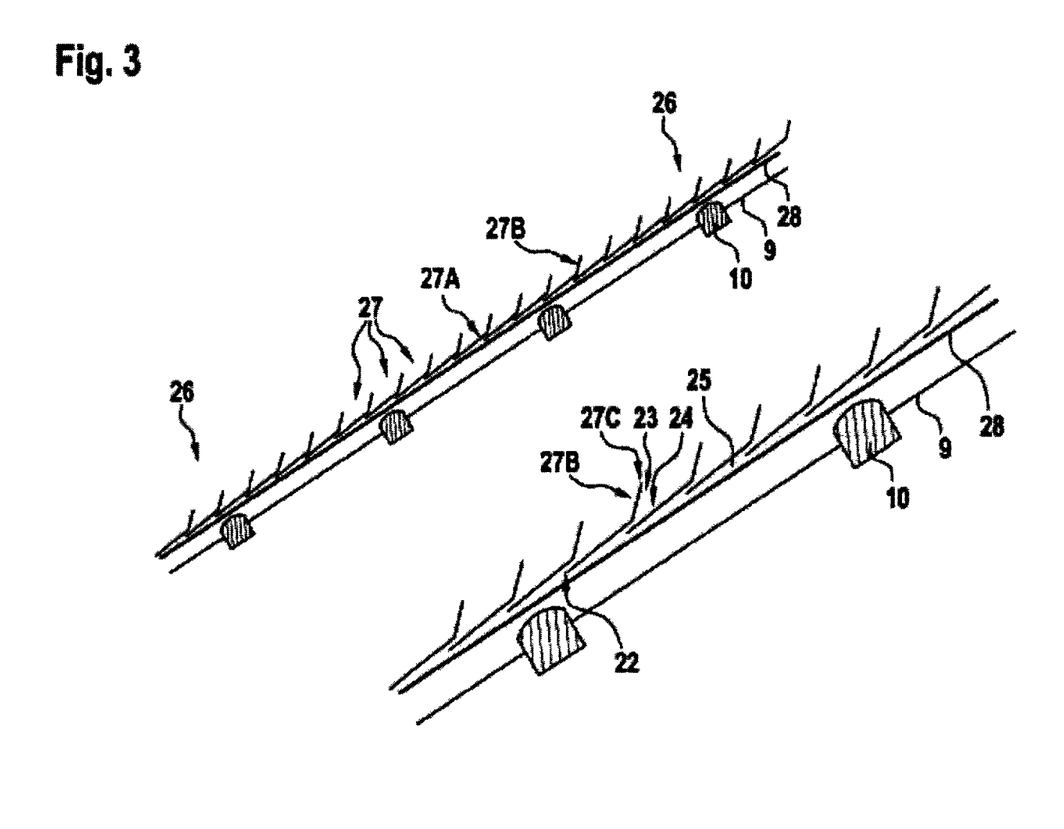
FIG. 3 is a side view of a portion of an embodiment of a chip discharge device.

FIG. 3 shows a portion of a chip discharge device according to a first embodiment, together with a view of an enlarged portion thereof, in which, similar to what is shown in FIG. 1, an endlessly circulating belt 9 is provided which has magnets 10 spaced apart from one another. However, the stationary surface 28 which is comparable to the stationary surface 8 from FIG. 1 is no longer used as a support surface for the accumulations of metal chips and coolant which follow the magnets 10 in the upward movement thereof, but is instead used as a surface along which coolant released from the metal chip accumulations 13 flows back.

The metal chip accumulations 13, however, move on a discharge path which is determined by a further surface 26. This surface 26 is formed from a plurality of slats 27 which have a base portion 27A, which extends substantially parallel to the direction of movement of the magnetic belt 9 but rises (slightly) more steeply due to a scale-like arrangement relative to the preceding and subsequent slats. A ramp portion 27B is connected to the base portion 27A, the free end 27C of which ramp portion is spaced apart from the base portion 27A of the next slat 27 in a spacing direction, orthogonally to the conveying direction of the belt 9 and in the drawing plane of FIG. 3. The chip accumulation 13 is drawn up the ramp region 27B by the magnets 10 while it is supported thereon. Since the magnets 10 continue to move, the chip accumulation continues to follow the movement of the magnets 10 and, by jumping from the end 27C of one slat 27 to the base portion 27A of the next slat 27, said accumulation returns to the surface 26 which supports the chip accumulation. There is therefore a point on the discharge path at which the supporting surface is temporarily withdrawn from the discharged chips, that is to say a point of support withdrawal, which is also referred to in the following as a jump point. As a result of the ascent in the additionally steeper ramp region 27B, but in particular as a result of the jump at the jump point 23 and the subsequent impact at 24 on the subsequent slat 27, more coolant is released from the metal chip accumulation and can flow back in the direction of the coolant tank.

Since the ramp region 27B, seen orthogonally to the surface 28, overlaps the subsequent slat 27, the region below the ramp region 27B is already downstream of the deflection point in the return flow, at which point the return-flowing coolant is deflected out of the discharge path, along which the chip accumulations run upward, since no chip accumulations move upward below the ramp region 27B.

As can be seen from FIG. 3, the transition between two consecutive slats 27 is open, at least partially (seen across the width of the belt 9). The return-flowing coolant therefore reaches the surface 28 and can flow back along said surface into the coolant tank. On this return-flow path, the return-flowing coolant no longer encounters metal chip accumulations which are subsequently removed, since this does not take place on the surface 28, but on the surface 26 which has the slats 27. Return-flowing oil is no longer entrained in the region of the surface 28 by subsequent metal chip accumulations. The opening region of a slat 27 into the return flow on the surface 28 is protected by the preceding slat 27, by means of the base portion 27A and/or the ramp portion 27B thereof.

Figure 4:
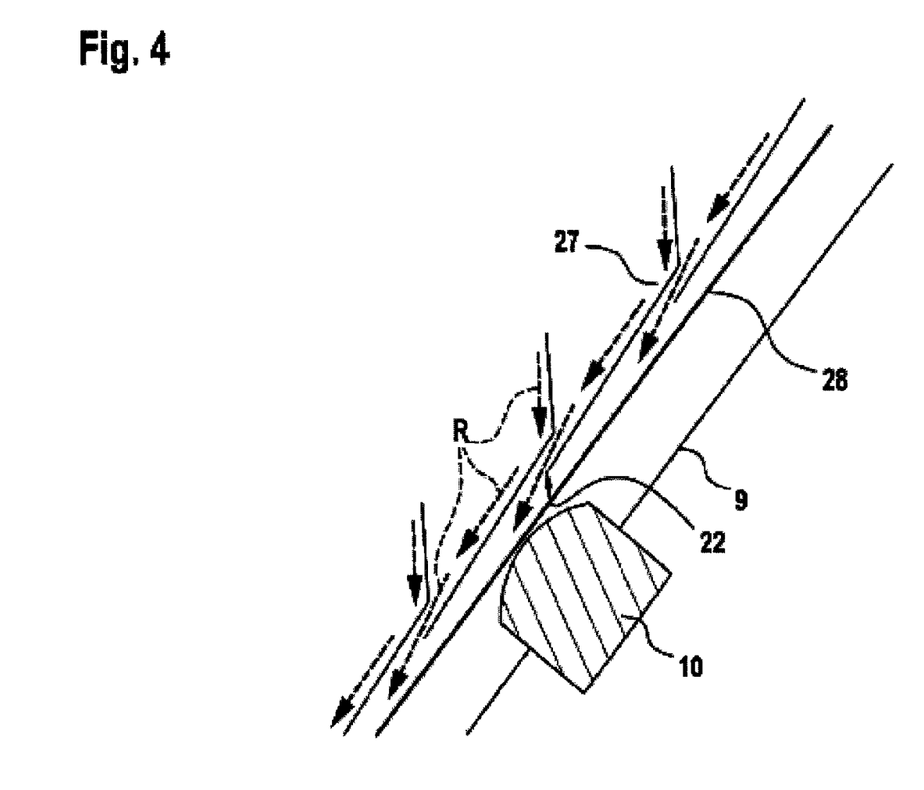
FIG. 4 shows flow paths of a return-flowing liquid for the embodiment of FIG. 3, FIG. 5a, 5b show modifications of the embodiment of FIG. 3.

The return flow R of the coolant, for example in the form of a cooling oil film flowing downward, in the case of oil being used as a coolant, is shown further enlarged in FIG. 4 by the dashed arrows. In any case, a portion of the return-flowing cooling oil will in this case no longer be able to encounter the metal chip accumulations, due to the deflection of the return flow out of the discharge path of the metal chip accumulations. In a preferred design of the properties of the belt 9 which has the magnets 10, and when a suitable conveying speed is selected, almost the entire quantity of cooling oil released within a slat 27 may reach the deflection point before the subsequent metal chip accumulation reaches said point during the movement thereof along the discharge path determined by the slats 27.

Figure 5A:
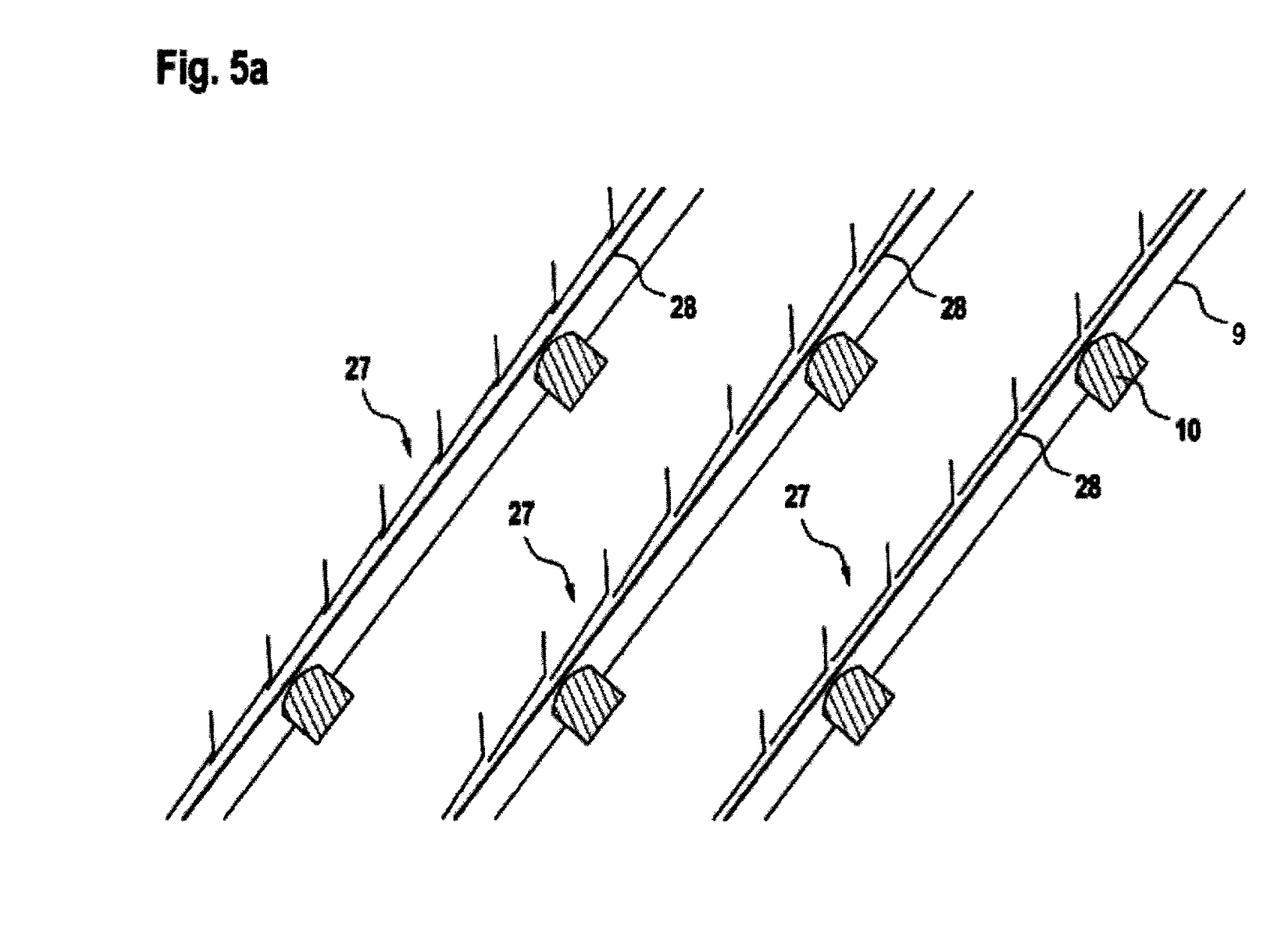

FIG. 5a shows further modifications of the view of FIG. 3 with regard to the design of the openings between consecutive plates 27, in which the variant shown on the right-hand side in FIG. 5 no longer comprises a scale-like arrangement of the slats, but still comprises a protective overlap of the opening into the return flow on the surface 28, by means of the ramp region 27B.

Figure 5B:
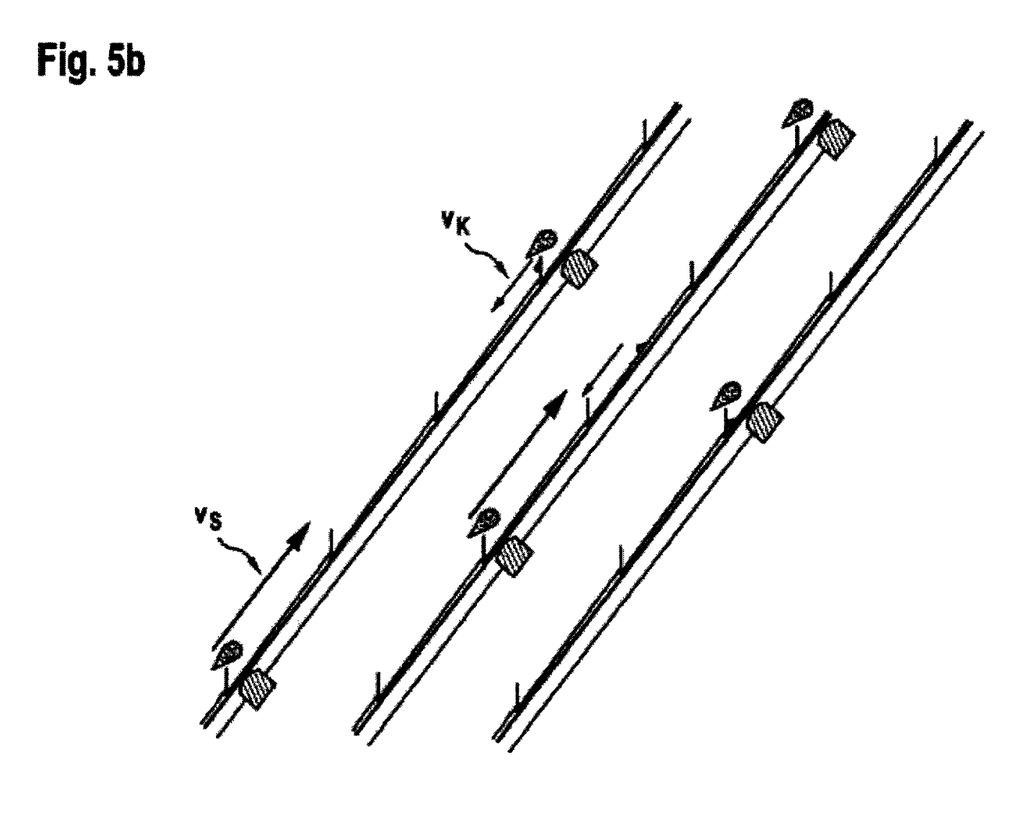

FIG. 5b shows an example of an embodiment similar to FIG. 3, in which the ratio ⅙ of the spacing between two consecutive magnets 10 to the spacing between two consecutive inflection points is approximately 3, and in which the ratio α of the speed of movement of the magnets 10 to the return-flow speed of the coolant is approximately 2. In this case, 5b only shows one instant of a process of the movements of the chip accumulations 13 by means of the magnet 10, and of the return flows of the coolant, which process takes place continuously on all regions of all slats 27.

Figure 6:
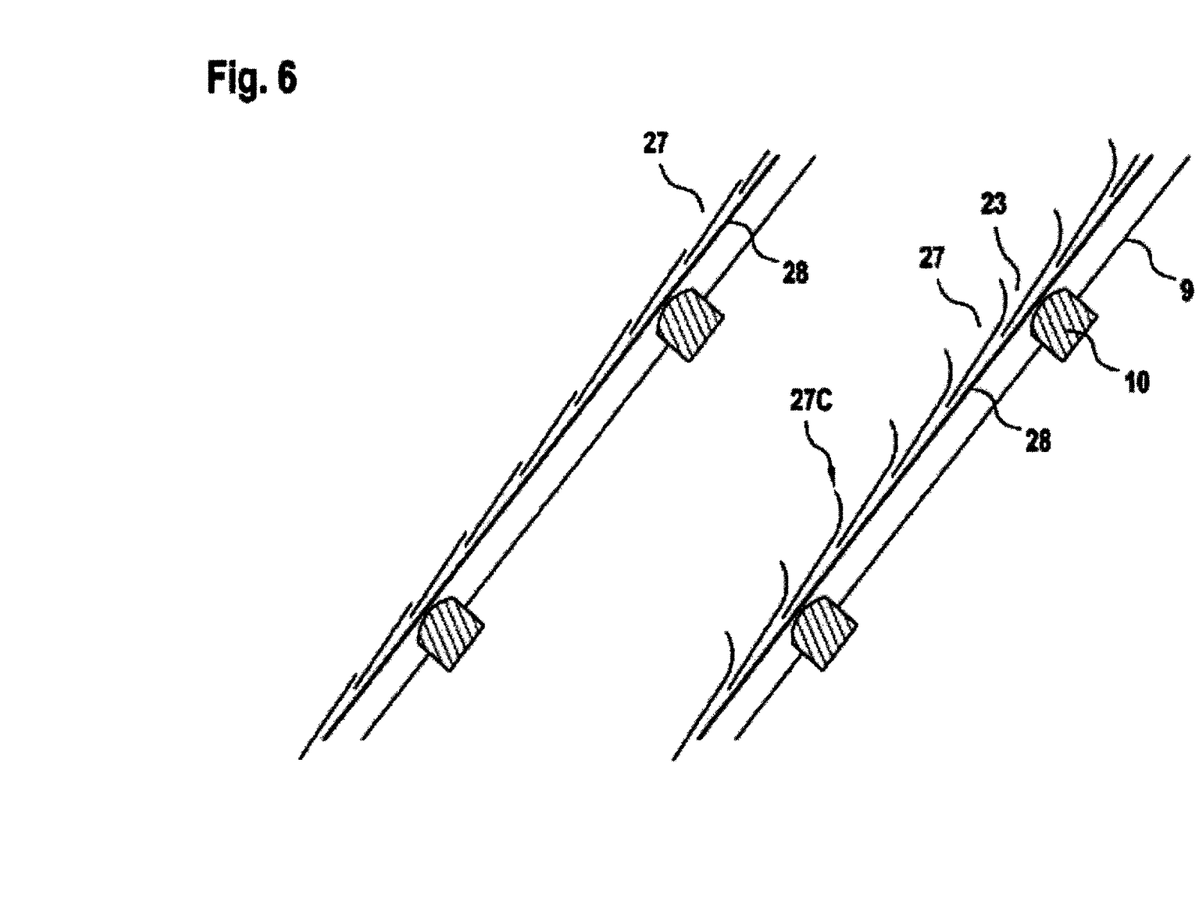
FIG. 6 shows further modifications of the embodiment of FIG. 3.

FIG. 6 shows yet further modifications; in the left-hand view, the ramp region 27B is omitted, such that there is barely a support withdrawal point left, since the chip accumulation is guided in an almost continuously supported manner over the step formed due to the overlap of consecutive slats 27. In the right-hand view of FIG. 6, however, the ramp shape is not linear, but instead curves upward. This leads to an increasing resistance as a chip accumulation ascends the ramp, as a result of which the metal chip accumulation is increasingly hindered from following the movement of the magnet 10. The pile of metal chips remains slightly longer in the region of the slat end 27C, before it is forced to jump at the jump point 23.

Figure 7:
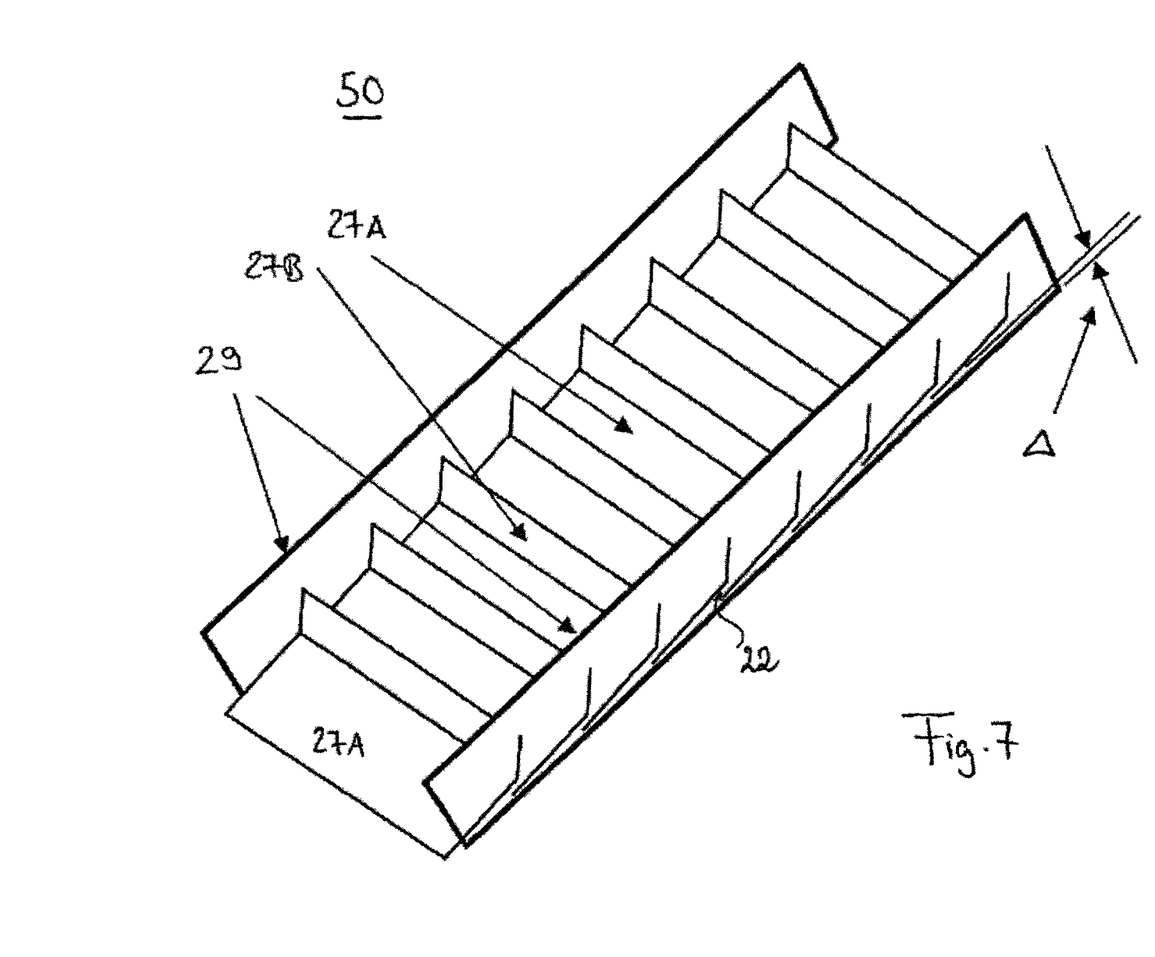
FIG. 7 shows an attachment having functions of the chip discharge device of the embodiment of FIG. 3, FIG. 8 likewise shows an attachment having functions of a chip discharge device, and FIG. 9 schematically shows a toothing machine having a chip discharge device.

FIG. 7 shows an embodiment in the form of an attachment 50 which can be placed on an oblique surface, which can be, for example, the only fixed surface for metal-chip discharge of a conventional magnetic-belt chip conveyor. In this case a distance Δ remains between the lower face of the base portion 27A and the underlying surface 28. The slats 27 are delimited on the left-hand and right-hand sides by lateral boundaries 29.

In order for the chip accumulations to be able to run onto the first lower base portion 27A of the attachment 50 shown in FIG. 7 with as little hinderance as possible and not get caught on the lower edge of this first lower base portion 27A, the lower edge thereof must rest on the surface 28. Alternatively, a separate portion can also be mounted on the surface 28 below the edge of the first lower base portion 27A, having the lower edge thereof resting on the surface 28 and overlapping with the first lower base portion 27A. It is also advantageous, in order to prevent chip build-up, for this first lower edge to lie below the minimum required level of coolant in the coolant tank, since a chip build-up at this first edge is more difficult inside the coolant than outside, due to the buoyancy effect of the coolant on the chips.

Figure 8:
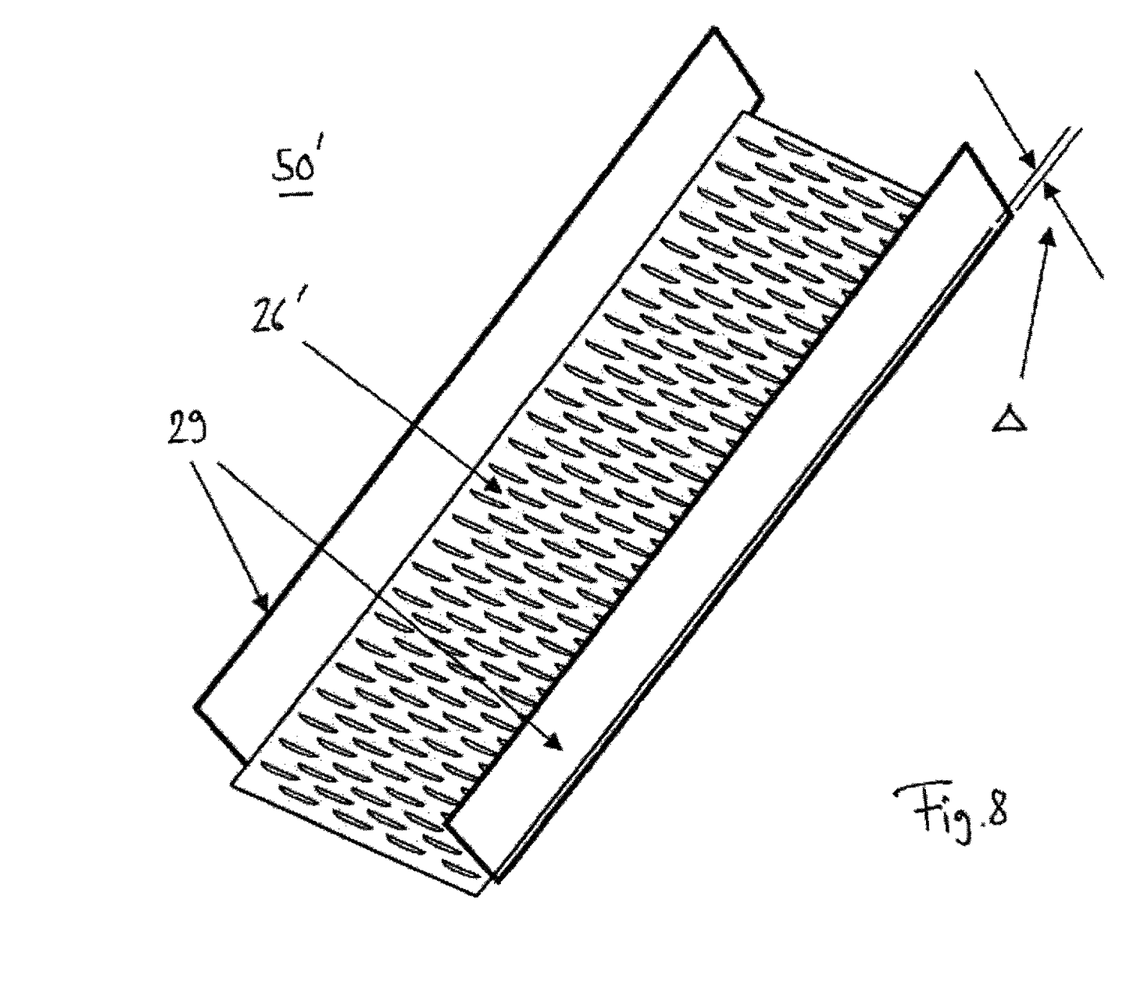

FIG. 8 shows an alternative design of an attachment 50', in this case diversion points and deflection points are formed in the form of openings in a planar surface that are punched and bent upward. There is, however, the distance A of the base surface 26' to the surface 28, the lower edge of the base surface 26' rests on the surface 28.

The design of the surface 26, 26' which determines the discharge path can be achieved, for example, using a configuration of sheet-metal strips. As already explained above, these slat-forming sheet-metal strips can be mounted so as to overlap somewhat, in order to make it more difficult for the chips to get stuck or for the chips to pass between two sheet metal strips/slats on the underlying surface 28 for the transport of liquid.

The angle and height of the ramp regions should be selected such that the jump of the individual chips and the accumulations thereof is as large as possible, but the circulating magnets/magnetic field regions are still able to reliably move the individual chips and the accumulations thereof upward, over all of the ramp portions, i.e. that the force caused by the movement of the magnets is greater than the opposing downhill force.

Between two sheet-metal strips/slats there is also the opening 22 for the return-flowing liquid to flow into the return-flow chamber. In particular in the case of high-viscosity coolants such as oil, a plurality of openings of this kind are preferably arranged within a length that corresponds to the spacing between two magnets.

Various arrangements are possible in the design of the ramp regions 27B, as can also be seen from the drawing, such as continuously curved shapes or a combination of a round and a straight region.

The return-flow region does not necessarily have to extend in the direction of gravity separately with respect to the discharge path, but could also extend separately in the width direction, i.e. it can be arranged next to the discharge path or between two or more discharge paths. In this case, the coolant escaping from the chip accumulations should be supplied to this return-flow region, which extends in the width direction so as to be separate from the discharge path. This can be achieved, for example, in that the coolant which is escaping from the chip accumulation and flowing back collects behind support withdrawal points and is directed laterally into the return-flow regions by an arrangement of the support withdrawal points that is angled toward the chip-discharge direction.

Ramp portions used in the surface 28, placed on the surface 28 or incorporated into the surface 28 as support withdrawal points are in this case used as half-sided bridge regions for the chip accumulations which along the discharge path, in order to bridge the coolant flows which form behind the support withdrawal points, transverse to the conveying direction, together with the movement components which are then required.

It would also be conceivable to design ramp regions as support withdrawal points or differently designed obstacles of the surface which defines the discharge path, in the manner of a herringbone pattern, with or without, preferably without, a gap between the support withdrawal points/obstacles of the herringbone pattern which are obliquely mounted on both sides. As a result of the herringbone pattern, the point of which points upward, the chips or the accumulations of said chips will concentrate in the central region of the stationary, oblique support surface during the upward movement of said chips, while the coolant flows along behind the edges of the support withdrawal points/obstacles, on both boundaries, to the return-flow region, and flows downward along this return-flow region into the liquid tank.

It would also be conceivable to arrange a plurality of herringbone patterns, which are described above, on the discharge path such that they point upward, are parallel next to one another and laterally spaced, such that the coolant can also flow back downward between the parallel portions of the chip removal region, into the coolant tank.

For arrangements of this kind, the circulating magnets should not extend into the return-flow region which is separated from the chip removal area in the width direction, and/or the upward-moving chip accumulations should be steered by a suitable arrangement of the support withdrawal points/obstacles as described above, such that said accumulations cannot move upward in the return-flow region.

Combinations of the designs explained above are also considered.

Figure 9:
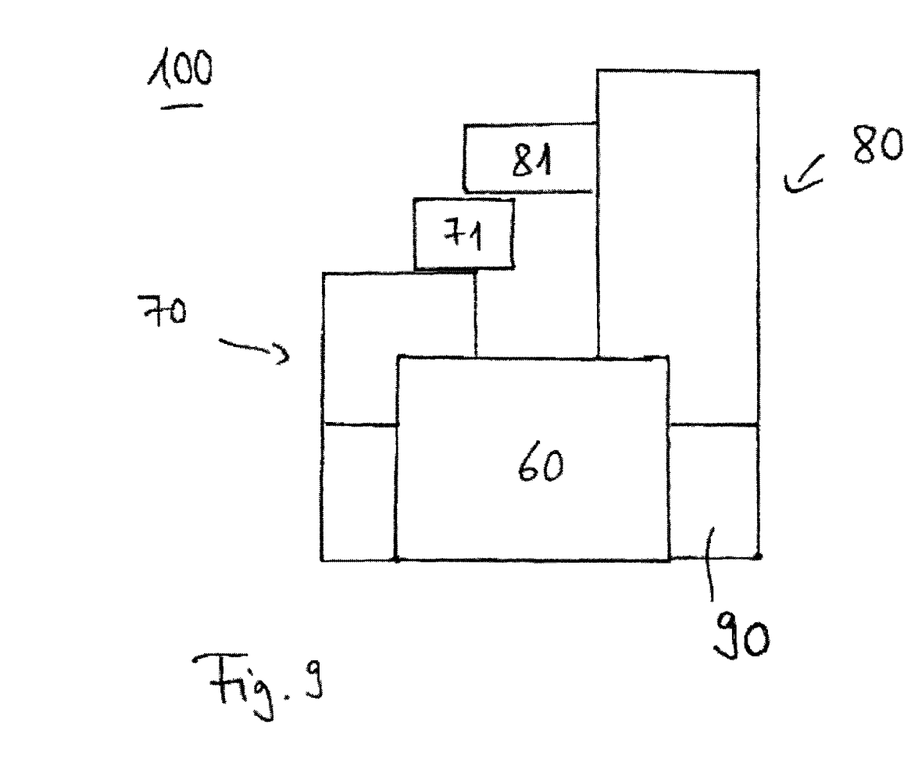

In FIG. 9 a toothing machine 100 is schematically shown which has a machine bed 90, a tool side 80 having a schematically illustrated tool 81, and a tool side 70 having a schematically illustrated workpiece 71, and has a chip discharge device 60. For example, the toothing machine 100 could be a skiving machine, or it could also be a hobbing machine or other chip-removing toothing machines.

The surface 26', 26 and the slats 27 (as well as the attachment 50, 50') are preferably arranged so as to be detachable from the surface 28, which makes facilitates cleaning.

The invention is not restricted to the specifications described in the aforementioned examples. Rather, the individual features of the above description and the following claims may be essential, individually and in combination, for implementing the invention in its different embodiments.

The invention claimed is:

1. A method for the chip-removing production or machining of a workpiece by means of a machining tool in which method a liquid (20) which mixes and accumulates with chips (30) produced during the machining is used for lubricating and/or cooling during the machining, and in which the chips are discharged from the accumulation of liquid and chips, counter to a downhill force, along a discharge path having a surface (26) by means of a magnetic force, a return flow of the liquid carried away by the discharged chips occurring due to the downhill force, characterized in that the return flow is deflected out of the discharge path and the discharge path has at least one support withdrawal point (23) at which a supporting surface of the discharged chips is temporarily withdrawn from said chips, wherein the return-flowing liquid feeds into a return-flow chamber (25) via one or more openings (22), said return-flow chamber being located below the discharge path surface, and the discharge path is separated from said one or more openings (22) by a barrier.

2. The method according to claim 1, wherein the magnetic force is effected by first regions which move along the discharge path in a discharge direction and have a strong magnetic field, which first regions are separated by second regions which have a lower magnetic field.

3. The method according to claim 2, in which at least two deflection points (24) are provided along the discharge path, and the ratio of the spacing between consecutive two of said deflection points in the discharge direction to the spacing between consecutive two of said first regions in the discharge direction is less than $1/(1+\gamma\alpha)$, where the factor $\gamma$ is at least $\frac{1}{5}$ and $\alpha$ is the ratio of the speed of the movement of said first regions to the return-flow speed of the liquid.

4. The method according to claim 3, in which said at least two consecutive deflection points are the first deflection points along the discharge path.

5. The method according to claim 1 in which a deflection point (24) is assigned to each of said at least one support withdrawal point (23).

6. The method according to claim 1 in which one or more portions are provided in which liquid flowing back from a deflection point flows back, spatially separated from and parallel to a liquid flowing back from a deflection point which is subsequent in a discharge direction, wherein the discharge path at the parallel flow has a ramp portion upstream of one of said at least one support withdrawal point.

7. The method according to claim 1 in which the barrier is formed by a ramp portion (27B) and/or a base portion (27A).

8. The method of claim 1 wherein said workpiece comprises a toothing on said workpiece.

9. The method of claim 1 wherein said machining tool comprises a toothing tool.

* * * * *